United States Patent
Dan et al.

(10) Patent No.: US 10,316,383 B2
(45) Date of Patent: Jun. 11, 2019

(54) AUSTENITIC STAINLESS STEEL AND METHOD FOR PRODUCING THE SAME

(71) Applicant: NIPPON STEEL & SUMITOMO METAL CORPORATION, Tokyo (JP)

(72) Inventors: Etsuo Dan, Amagasaki (JP); Masaaki Terunuma, Osaka (JP); Takahiro Osuki, Takarazuka (JP); Tomohiko Omura, Kishiwada (JP); Jun Nakamura, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 282 days.

(21) Appl. No.: 15/303,532

(22) PCT Filed: Apr. 17, 2015

(86) PCT No.: PCT/JP2015/002121
§ 371 (c)(1),
(2) Date: Oct. 12, 2016

(87) PCT Pub. No.: WO2015/159554
PCT Pub. Date: Oct. 22, 2015

(65) Prior Publication Data
US 2017/0029911 A1    Feb. 2, 2017

(30) Foreign Application Priority Data
Apr. 17, 2014 (JP) .................. 2014-085627

(51) Int. Cl.
| | |
|---|---|
| *C21D 9/00* | (2006.01) |
| *C21D 6/00* | (2006.01) |
| *C21D 7/13* | (2006.01) |
| *C22C 38/02* | (2006.01) |
| *C22C 38/44* | (2006.01) |
| *C22C 38/46* | (2006.01) |
| *C22C 38/48* | (2006.01) |
| *C22C 38/58* | (2006.01) |
| *C22C 38/00* | (2006.01) |
| *B21D 22/02* | (2006.01) |
| *C22C 33/04* | (2006.01) |
| *C21D 8/02* | (2006.01) |
| *C21D 8/00* | (2006.01) |

(52) U.S. Cl.
CPC ......... *C21D 9/0068* (2013.01); *B21D 22/022* (2013.01); *C21D 6/004* (2013.01); *C21D 6/005* (2013.01); *C21D 7/13* (2013.01); *C21D 8/0226* (2013.01); *C22C 33/04* (2013.01); *C22C 38/00* (2013.01); *C22C 38/001* (2013.01); *C22C 38/002* (2013.01); *C22C 38/02* (2013.01); *C22C 38/44* (2013.01); *C22C 38/46* (2013.01); *C22C 38/48* (2013.01); *C22C 38/58* (2013.01); *C21D 8/005* (2013.01); *C21D 2211/001* (2013.01)

(58) Field of Classification Search
None
See application file for complete search history.

(56) References Cited

U.S. PATENT DOCUMENTS

| | | | | |
|---|---|---|---|---|
| 4,897,132 A | * | 1/1990 | Yamamoto | C22C 38/001 148/327 |
| 4,960,470 A | * | 10/1990 | Honkura | C22C 38/001 148/608 |
| 2005/0178477 A1 | * | 8/2005 | Igarashi | C22C 38/001 148/325 |
| 2005/0178478 A1 | * | 8/2005 | Igarashi | C22C 38/58 148/325 |
| 2006/0193743 A1 | * | 8/2006 | Semba | C22C 38/001 420/53 |
| 2009/0081069 A1 | * | 3/2009 | Takeda | C22C 38/001 420/53 |
| 2014/0017111 A1 | * | 1/2014 | Omura | C22C 38/001 420/40 |
| 2014/0186101 A1 | * | 7/2014 | Hirata | C22C 38/02 403/272 |

FOREIGN PATENT DOCUMENTS

| | | |
|---|---|---|
| CA | 2839128 | 1/2013 |
| JP | 07-310144 | 11/1995 |

(Continued)

OTHER PUBLICATIONS

English translation of the Written Opinion of the International Search Authority dated Jul. 14, 2015 for PCT/JP2015/002121; 5 pages.*

(Continued)

*Primary Examiner* — Helene Klemanski
(74) *Attorney, Agent, or Firm* — Clark & Brody

(57) ABSTRACT

There is provided an austenitic stainless steel having a high strength and an excellent hydrogen brittleness resistance and further having an excellent machinability. The austenitic stainless steel of the present embodiment has a chemical composition including: in mass %, C: 0.10% or less; Si: 1.0% or less; Mn: 2.1 to 6.0%; P: 0.045% or less; S: 0.1% or less; Ni: 8.0 to 16.0%; Cr: 15.0 to 30.0%; Mo: 1.0 to 5.0%; N: 0.05 to 0.45%; Nb: 0 to 0.50%; and V: 0 to 0.50%, with the balance being Fe and impurities, and satisfying Formula (1). The austenitic stainless steel of the present embodiment has a grain size number of less than 8.0 and a tensile strength of 690 MPa or more.

$15 \leq 12.6C + 1.05Mn + Ni + 15N$      (1)

16 Claims, 3 Drawing Sheets

(56) References Cited

FOREIGN PATENT DOCUMENTS

| | | |
|---|---|---|
| JP | 07-316653 | 12/1995 |
| JP | 08-269547 | 10/1996 |
| JP | 5896089 | 3/2016 |
| WO | 2004/083476 | 9/2004 |
| WO | 2004/083477 | 9/2004 |
| WO | 2004/111285 | 12/2004 |
| WO | 2012/132992 | 10/2012 |

OTHER PUBLICATIONS

English translation of JPH 08/269547, Oct. 1996; 9 pages.*
English translation of JPH 07/316653, Dec. 1995; 11 pages.*
English translation of JPH 07/310144, Nov. 1995; 7 pages.*

* cited by examiner

AUSTENITIC STAINLESS STEEL AND METHOD FOR PRODUCING THE SAME

TECHNICAL FIELD

The present invention relates to a stainless steel and a method for producing the same, more specifically to an austenitic stainless steel and a method for producing the same.

BACKGROUND ART

In recent years, fuel cell powered vehicles that run on hydrogen as fuel, and hydrogen stations where fuel cell powered vehicles are supplied with hydrogen, have been under development. A stainless steel is one of the candidates for a material used for fuel cells.

When a stainless steel is used for fuel cells, the stainless steel is used in a high-pressure hydrogen gas environment. For this reason, a stainless steel used for fuel cells needs to have an excellent hydrogen brittleness resistance. At present, according to the standards of compressed hydrogen containers for automobiles provided by the High Pressure Gas Safety Act, SUS316L is accredited as a stainless steel having an excellent hydrogen brittleness resistance.

However, in consideration of lowering weight of fuel cell powered vehicles, downsizing hydrogen stations, and operations under high pressure in a hydrogen station, it is preferable that a stainless steel used for the above applications has a high strength.

As previously described, a stainless steel used for fuel cells needs to have an excellent hydrogen brittleness resistance and a high strength. Meanwhile, when a stainless steel is to be used for fuel cells, the stainless steel is processed into a desired shape. For example, machining such as cutting may be performed on stainless steel products of high strength. In this case, it is preferable that the stainless steel further has an excellent machinability.

International Application Publication No. WO2004/083476 (Patent Literature 1), International Application Publication No. WO2004/083477 (Patent Literature 2), International Application Publication No. WO2004/111285 (Patent Literature 3), and International Application Publication No. WO2012/132992 (Patent Literature 4) propose stainless steels that are used in high-pressure hydrogen environments and have high strengths.

The stainless steel for hydrogen gas disclosed in Patent Literature 1 contains: in mass %, C: 0.02% or less; Si: 1.0% or less; Mn: 3 to 30%; Cr: more than 22% to 30%; Ni: 17 to 30%; V: 0.001 to 1.0%; N: 0.10 to 0.50%; and Al: 0.10% or less, with the balance being Fe and impurities. Of the impurities, P is 0.030% or less, S is 0.005% or less, and Ti, Zr, and Hf are each 0.01% or less. The contents of Cr, Mn, and N satisfy the following formula.

$$5Cr+3.4Mn \leq 500N$$

The stainless steel for high-pressure hydrogen gas disclosed in Patent Literature 2 contains: in mass %, C: 0.04% or less; Si: 1.0% or less; Mn: 7 to 30%; Cr: 15 to 22%; Ni: 5 to 20%; V: 0.001 to 1.0%; N: 0.20 to 0.50%; and Al: 0.10% or less, with the balance being Fe and impurities. Of the impurities, P is 0.030% or less, S is 0.005% or less, and Ti, Zr, and Hf are each 0.01% or less, which satisfy the following formula.

$$2.5Cr+3.4Mn \leq 300N$$

The austenitic stainless steel for hydrogen gas disclosed in Patent Literature 3 has a chemical composition including: in mass %, C: 0.10% or less; Si: 1.0% or less; Mn: 0.01 to 30%; P: 0.040% or less; S: 0.01% or less; Cr: 15 to 30%; Ni: 5.0 to 30%; sol.Al: 0.10% or less; and N: 0.001 to 0.30%, with the balance being Fe and impurities. The austenitic stainless steel includes a micro-structure in which an X-ray integrated intensity I (111) on a cross section along a direction perpendicular to a processing direction is five times or less as much as that in a random orientation, and an X-ray integrated intensity I (220) on a cross section along the processing direction satisfies $(220)/I (111) \leq 10$.

The austenitic stainless steel for high-pressure hydrogen gas disclosed in Patent Literature 4 contains: in mass %, C: 0.10% or less; Si: 1.0% or less; Mn: 3% or more and less than 7%; Cr: 15 to 30%; Ni: 10% or more and less than 17%; Al: 0.10% or less; N: 0.10 to 0.50%; and at least one of V: 0.01 to 1.0% and Nb: 0.01 to 0.50%, with the balance being Fe and impurities. Of the impurities, P is 0.0050% or less, and S is 0.050% or less. The austenitic stainless steel contains an alloy carbo-nitride at $0.4/\mu m^2$ or more in cross section observation, the alloy carbo-nitride having a tensile strength of 800 MPa or more, a grain size number (ASTM E112) of 8 or more, and a maximum diameter of 50 to 1000 nm.

CITATION LIST

Patent Literature

Patent Literature 1: International Application Publication No. WO2004/083476
Patent Literature 2: International Application Publication No. WO2004/083477
Patent Literature 3: International Application Publication No. WO2004/111285
Patent Literature 4: International Application Publication No. WO2012/132992

The stainless steels disclosed in Patent Literatures 1 and 2 have strengths of 700 MPa or more even after solution treatment is performed thereon. However, the stainless steel of Patent Literature 1 is produced at a high cost because it has a high content of Ni. The stainless steel of Patent Literature 2 may fail to provide an excellent workability because it has a high content of Mn. As to the stainless steels of Patent Literature 3 and Patent Literature 4, solution treatment and cold working are performed to achieve high strengths. However, the cold working may lead to a decrease in hydrogen brittleness resistance. Furthermore, as to the stainless steel disclosed in Patent Literatures 1 to 4 described above, there are no studies conducted on machinability. Therefore, even with the stainless steels described in Patent Literature 1 to 4 mentioned above, an excellent hydrogen brittleness resistance, a high strength, and an excellent machinability are not provided in some cases.

SUMMARY OF INVENTION

An objective of the present invention is to provide an austenitic stainless steel having an excellent hydrogen brittleness resistance and a high strength, and further having an excellent machinability.

The austenitic stainless steel of the present embodiment has a chemical composition including: in mass %, C: 0.10% or less; Si: 1.0% or less; Mn: 2.1 to 6.0%; P: 0.045% or less; S: 0.1% or less; Ni: 8.0 to 16.0%; Cr: 15.0 to 30.0%; Mo: 1.0 to 5.0%; N: 0.05 to 0.45%; Nb: 0 to 0.50%; and V: 0 to 0.50%, with the balance being Fe and impurities, and satisfying Formula (1). The austenitic stainless steel of the present embodiment has a grain size number of less than 8.0 and a tensile strength of 690 MPa or more.

$$15 \leq 12.6C+1.05Mn+Ni+15N \quad (1)$$

The symbols of elements in Formula (1) are to be substituted by the contents of corresponding elements (in mass %).

A method for producing the previously-mentioned austenitic stainless steel includes a step of preparing a starting material having the previously-mentioned chemical composition and a step of performing hot working on the starting material one or a plurality of times. In the step of performing the hot working, a reduction of area in the hot working after last heating is 70% or less.

The austenitic stainless steel according to the present embodiment has an excellent hydrogen brittleness resistance and a high strength and further has an excellent machinability.

DESCRIPTION OF EMBODIMENTS

The present inventors conducted investigations and studies on the machinability, hydrogen brittleness resistance, and strength of an austenitic stainless steel, and obtained the following findings.

(A) A machinability is linked to cutting resistance and chip disposability (indicating how easy chips can be detached from a cutting tool) in cutting. If a cutting resistance is low, and a chip disposability is high, wear in a cutting tool is suppressed. That is, the machinability of a steel is increased.

A cutting resistance depends on the tensile strength of a work material under specified cutting conditions. A chip disposability can be determined based on the length of a chip at the time when the chip snaps in cutting. The brittler a chip is, the higher the chip disposability is. The brittleness of a chip depends on the elongation and tensile strength of a work material. Therefore, suppressing the tensile strength and elongation of an austenitic stainless steel, which is a work material, decreases the cutting resistance and increases the chip disposability. As a result, the machinability thereof is increased.

Figure 1:
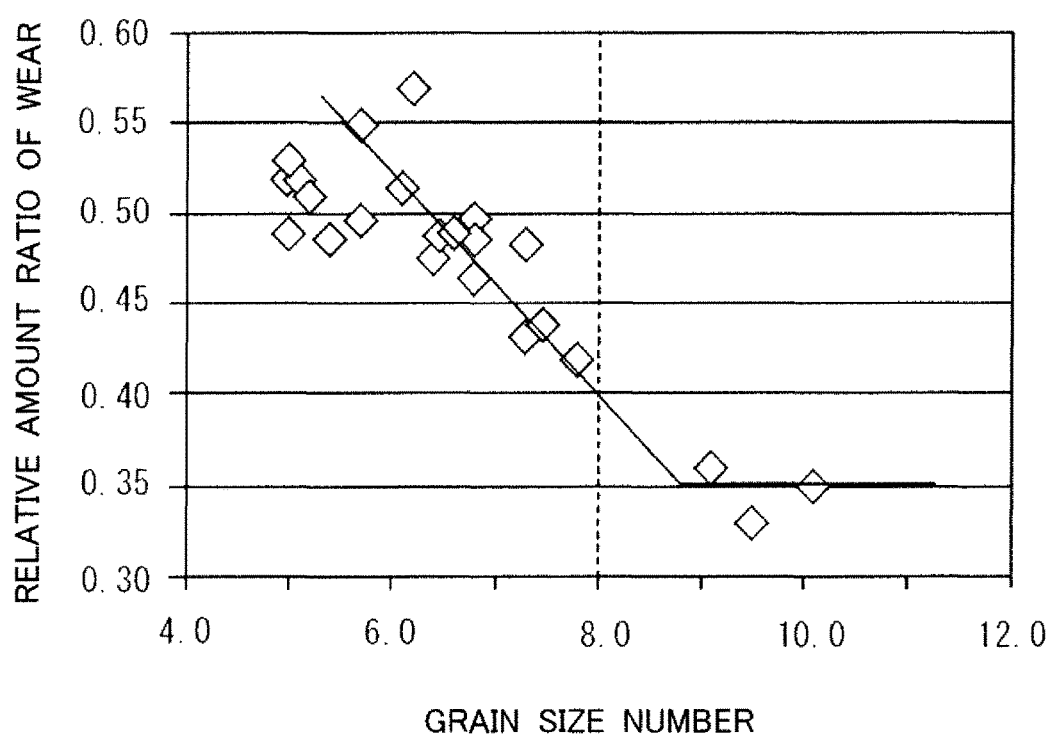
FIG. 1 is a diagram illustrating the relation between the grain size number of a steel and a relative amount ratio of wear which is an index of machinability.

If the diameters of crystal grains in a steel are large, it is possible to suppress the tensile strength and the elongation of the steel. FIG. 1 is a diagram illustrating the relation between the grain size number of a steel and a relative amount ratio of wear which is an index of machinability. FIG. 1 is a plot of the results of the example, which will be described later. A relative amount ratio of wear is a ratio of the amount of wear of a cutting tool in the case where a steel having a chemical composition equivalent to that of SUS316 in JIS Standard is subjected to peeling treatment (a reference amount of wear) with respect to the amount of wear of the cutting tool in the case where an austenitic stainless steel is subjected to peeling treatment, under the same conditions. A higher relative amount ratio of wear means a less wear in a cutting tool as compared with the reference amount of wear, namely, a higher machinability of a steel.

Referring to FIG. 1, if a grain size number is more than 8.0, a machinability does not vary significantly. On the other hand, if a grain size number is 8.0 or less, the relative amount ratio of wear is increased significantly as the grain size number becomes small. Therefore, in the case of an austenitic stainless steel having the chemical composition according to the present embodiment, an excellent machinability can be obtained by making the grain size number 8.0 or less.

(B) Meanwhile, coarsening crystal grains may incur the risk of decreasing a hydrogen brittleness resistance. Thus, the present embodiment is intended to increase the stabilization of an austenite so as to increase the hydrogen brittleness resistance even if the crystal grains are coarse. The diffusion coefficient of hydrogen in an austenite is low. Stabilizing an austenite makes hydrogen difficult to diffuse in steel. Furthermore, the generation of a martensite having a high susceptibility to hydrogen brittleness is suppressed. As a result, the hydrogen brittleness resistance is increased.

Carbon (C), nitrogen (N), manganese (Mn), and nickel (Ni) are elements that stabilize an austenite. Thus, by making these elements contained in appropriate amounts, the hydrogen brittleness resistance is increased.

Figure 2:
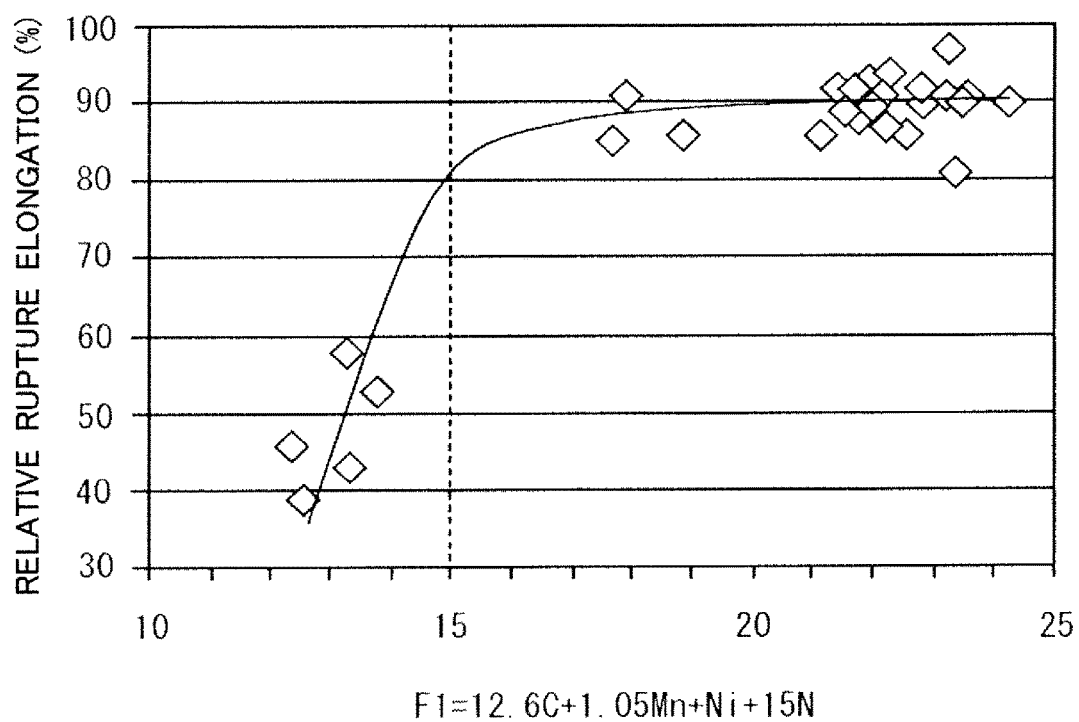
FIG. 2 is a diagram illustrating the relation between the formula defined with F1=12.6C+1.05Mn+Ni+5N, and a relative rupture elongation, which is an index of hydrogen brittleness resistance.

Let F1=12.6C+1.05Mn+Ni+15N. FIG. 2 is a diagram illustrating the relation between F1 and the hydrogen brittleness resistance. FIG. 2 is a plot of the results of the example, which will be described later. The term "relative rupture elongation" (%) in FIG. 2 is a ratio of a rupture elongation in a high-pressure hydrogen environment with respect to a rupture elongation in the atmosphere. A higher relative rupture elongation means a more excellent hydrogen brittleness resistance.

Referring to FIG. 2, if F1 is less than 15, the relative rupture elongation rapidly increases with an increase in F1. Then, if F1 becomes 15 or more, the relative rupture elongation does not increase significantly even with an increase in F1 but is substantially constant. That is, in the graph of FIG. 2, there is an inflection point at about F1=15. Therefore, when F1 is 15 or more, an excellent hydrogen brittleness resistance can be obtained.

(C) Coarsening crystal grains increases a machinability but incurs the risk of decreasing a strength. Thus, in the present embodiment, 1.0% or more of Mo is contained. This provides a high tensile strength even if the grain size number is less than 8.0.

The austenitic stainless steel of the present embodiment completed based on the findings described above has a chemical composition that contains, in mass %, C: 0.10% or less, Si: 1.0% or less, Mn: 2.1 to 6.0%, P: 0.045% or less, S: 0.1% or less, Ni: 8.0 to 16.0%, Cr: 15.0 to 30.0%, Mo: 1.0 to 5.0%, N: 0.05 to 0.45%, Nb: 0 to 0.50%, and V: 0 to 0.50%, with the balance being Fe and impurities, and satisfies Formula (1). The austenitic stainless steel of the present embodiment has a grain size number of less than 8.0 and a tensile strength of 690 MPa or more.

$$15 \leq 12.6C+1.05Mn+Ni+15N \quad (1)$$

The symbols of elements in Formula (1) are to be substituted by the contents of corresponding elements (in mass %).

The austenitic stainless steel described above may contain one or more elements selected from the group consisting of Nb: 0.01 to 0.50% and V: 0.01 to 0.50%.

The grain size number of the austenitic stainless steel described above is preferably 3.0 or more. In this case, the austenitic stainless steel described above has a still more excellent tensile strength.

The mixed grain ratio of the crystal grain micro-structure of the austenitic stainless steel described above is preferably 20% or less. In this case, it is possible to suppress the variations in strength of the austenitic stainless steel described above.

A starting material having the chemical composition described above is subjected to hot working one or more times, and after the last heating, subjected to hot working at a reduction of area of 70%, whereby the austenitic stainless steel described above is produced.

In this case, an austenitic stainless steel having the chemical composition described above can be made to have a grain size number of less than 8.0.

Hereinafter, the austenitic stainless steel of the present embodiment will be described in detail.

[Chemical Composition]

The austenitic stainless steel of the present embodiment has a chemical composition including the following elements.

C: 0.10% or less

Carbon (C) stabilizes an austenite having an fcc structure, where a hydrogen brittleness hardly occurs. However, an excessively high content of C results in the precipitation of carbide in grain boundaries, decreasing the toughness of a steel. Therefore, the content of C is made to be 0.10% or less. The upper limit of the content of C is preferably less than 0.10%, more preferably 0.08%, still more preferably 0.06%.

Si: 1.0% or less

Silicon (Si) is an impurity. Si is bonded to Ni and Cr to form intermetallic compounds. Furthermore, Si facilitates the growth of intermetallic compounds such as a sigma phase. These intermetallic compounds decrease the hot workability of steel. Therefore, the content of Si is made to be 1.0% or less. The upper limit of the content of Si is preferably 0.8%. The content of Si is preferably as low as possible.

Mn: 2.1 to 6.0%

Manganese (Mn) stabilizes an austenite and suppresses the generation of a martensite, which has a high susceptibility to hydrogen brittleness. Furthermore, Mn is bonded to S to form MnS, increasing the machinability of a steel. An excessively low content of Mn results in failure to provide the effects described above. On the other hand, an excessively high content of Mn results in a decrease in the ductility and hot workability of a steel. Therefore, the content of Mn is made to be 2.1 to 6.0%. The lower limit of the content of Mn is preferably more than 2.1%, more preferably 2.5%, still more preferably 3.0%. The upper limit of the content of Mn is preferably less than 6.0%.

P: 0.045% or less

Phosphorus (P) is an impurity. P decreases the hot workability and toughness of a steel. Therefore, the content of P is made to be 0.045% or less. The upper limit of the content of P is preferably less than 0.045%, more preferably 0.035%, still more preferably 0.020%. The content of P is preferably as low as possible.

S: 0.1% or less

Sulfur (S) is bonded to Mn to form MnS, increasing the machinability of a steel. However, an excessively high content of S results in a decrease in toughness of a steel. Therefore, the content of S is made to be 0.1% or less. The upper limit of the content of S is preferably less than 0.1%, more preferably 0.09%, still more preferably 0.07%. The content of S is preferably as low as possible.

Ni: 8.0 to 16.0%

Nickel (Ni) stabilizes an austenite. Furthermore, Ni increases the ductility and toughness of a steel. An excessively low content of Ni results in failure of providing the effects described above. On the other hand, an excessively high content of Ni results in saturation of the effects described above, increasing manufacturing costs. Therefore, the content of Ni is made to be 8.0 to 16.0%. The lower limit of the content of Ni is preferably more than 8.0%, more preferably 9.0%, still more preferably 10.5%. The upper limit of the content of Ni is preferably less than 16.0%, more preferably 15.0%.

Cr: 15.0 to 30.0%

Chromium (Cr) increases the corrosion resistance of a steel. An excessively low content of Cr results in failure to provide this effect. On the other hand, an excessively high content of Cr results in the generation of $M_{23}C_6$ carbide, decreasing in ductility and toughness of a steel. Therefore, the content of Cr is made to be 15.0 to 30.0%. The lower limit of the content of Cr is preferably more than 15.0%, more preferably 16.0%, still more preferably 17.0%, even still more preferably 18.0%. The upper limit of the content of Cr is preferably less than 30.0%, more preferably 25.0%.

Mo: 1.0 to 5.0%

Molybdenum (Mo) subjects an austenite to solid-solution strengthening. Furthermore, Mo increases the corrosion resistance of a steel. An excessively low content of Mo results in failure to provide the effect described above. On the other hand, an excessively high content of Mo is liable to result in the precipitation of intermetallic compounds, decreasing in ductility and toughness of a steel. Therefore, the content of Mo is made to be 1.0 to 5.0%. The lower limit of the content of Mo is preferably more than 1.0%, more preferably 1.2%. The upper limit of the content of Mo is preferably less than 5.0%, more preferably 4.0%, still more preferably 3.5%.

N: 0.05 to 0.45%

Nitrogen (N) stabilizes an austenite. Furthermore, N increases the strength of a steel through solid-solution strengthening. An excessively low content of N results in failure to provide the effects described above. On the other hand, an excessively high content of N causes the generation of coarse nitrides, decreasing the mechanical properties of a steel such as toughness. Therefore, the content of N is made to be 0.05 to 0.45%. The lower limit of the content of N is preferably more than 0.05%, more preferably 0.10%, still more preferably 0.15%, even still more preferably 0.21%. The upper limit of the content of N is preferably less than 0.45%, more preferably 0.40%.

The balance of the chemical composition of the austenitic stainless steel according to the present embodiment is Fe and impurities. The term "impurities" herein means elements that are mixed from ores and scraps used as raw material of a steel, or from the environment of a producing step.

The austenitic stainless steel of the present embodiment may further contain, in place of a part of Fe, one or more elements selected from the group consisting of Nb and V.

Nb: 0 to 0.50%

Nb is an optional element and may not be contained. If being contained, Nb causes the generation of alloy carbides, increasing the strength of a steel. However, an excessively high content of Nb results in saturation of the effect, increasing manufacturing costs. Therefore, the content of Nb is made to be 0 to 0.50%. The lower limit of the content of Nb is preferably 0.01%, more preferably 0.05%. The upper limit of the content of Nb is preferably less than 0.50%, more preferably 0.40%, still more preferably 0.30%.

V: 0 to 0.50%

V is an optional element and may not be contained. If being contained, V causes the generation of alloy carbides, increasing the strength of a steel. However, an excessively high content of V results in saturation of the effect, increasing manufacturing costs. Therefore, the content of V is made to be 0 to 0.50%. The lower limit of the content of V is preferably 0.01%, more preferably 0.05%. The upper limit of the content of V is preferably less than 0.50%, more preferably 0.35%, still more preferably 0.30%.

[Formula (1)]

The chemical composition described above further satisfies Formula (I).

$$15 \leq 12.6C + 1.05Mn + Ni + 15N \quad (1)$$

The symbols of elements in Formula (1) are to be substituted by the contents of corresponding elements (in mass %).

As mentioned previously, C, Mn, Ni, and N stabilize an austenite. The diffusion coefficient of hydrogen in an austenite is low. For this reason, hydrogens are difficult to diffuse in an austenite.

Let $F1=12.6C+1.05Mn+Ni+15N$. As illustrated in FIG. 2, when F1 is less than 15, an austenite difficult to stabilize, and thus the hydrogen brittleness resistance is low. On the other hand, when F1 is 15 or more, the hydrogen brittleness resistance becomes significantly high. Therefore, F1 is 15 or more. F1 is preferably 16 or more, more preferably 17 or more.

[Grain Size]

Furthermore, the grain size number specified in JIS 00551 (2005) of the austenitic stainless steel of the present embodiment is less than 8.0. For this reason, the austenitic stainless steel of the present embodiment has a low cutting resistance. When the cutting resistance is low, it is possible to suppress wear of a cutting tool, increasing the productivity. Furthermore, when the grain size number is less than 8, it is easy for chips to be detached from a work material and a cutting tool in cutting, which increases the chip disposability. As seen from the above, when the grain size number is less than 8.0, the machinability of the steel is increased. On the other hand, when the grain size number is excessively low, the tensile strength of a steel may be decreased. For this reason, the grain size number is preferably 3.0 or more, more preferably 4.0 or more.

The grain size number is determined by the following method. A test specimen for microscopy is taken from an austenitic stainless steel. On the taken test specimen, the microscopic test method on grain size specified in JIS G0551 (2005) is performed to evaluate the grain size number. Specifically, etching is performed on a surface of the test specimen using a well-known etching reagent (e.g., Glyceregia, Kalling's reagent, or Marble's reagent) so as to cause a crystal grain boundary on the surface to appear. In ten visual fields on the etched surface, a grain size number is determined for each visual field. The area of each visual field is about 40 mm². By performing a comparison with the grain size number standard chart specified in the section 7.1.2 of JIS G0551 (2005), the grain size number in each visual field is evaluated. The average of the grain size numbers of the respective visual fields is defined as a grain size number of the austenitic stainless steel of the present embodiment.

[Tensile Strength]

The tensile strength of the austenitic stainless steel of the present embodiment is 690 MPa or more. It is possible to make the tensile strength 690 MPa or more by making the austenitic stainless steel contain Mo at the content previously mentioned and further adjusting working conditions in the final operation of hot working, which will be described later. The tensile strength is preferably made to be 720 MPa or more. In order to increase the machinability of a steel, the tensile strength is preferably made to be 880 MPa or less.

[Mixed Grain Ratio]

If the crystal grain micro-structure is of mixed grain size, there is the risk of causing variations in strength or machinability. Therefore, the upper limit of a mixed grain ratio is preferably 25%, more preferably 20%. The lower the mixed grain ratio is, the more preferable it is. The mixed grain size refers to a state in which, in the microscopy mentioned previously, there are unevenly distributed grains having a grain size number that is higher or lower, by three or more, than the grain size number of grains with a maximum frequency in one visual field and the unevenly distributed grains occupy 20% or more of the area of the visual field, or a state in which, among the visual fields, there is a visual field having a grain size number higher or lower, by three or more, than that of the another visual field.

The mixed grain ratio can be measured by, for example, the following method. A test specimen for microscopy is taken from an austenitic stainless steel, and the previously-mentioned microscopic test method is performed. The mixed grain ratio can be determined by substituting, into Formula (2), the number of all visual fields observed in the microscopic test method, which is denoted by N, and the number of visual fields determined to be mixed grain size, which is denoted by n.

$$\text{Mixed grain ratio } (\%) = (n/N) \times 100 \quad (2)$$

By performing the producing step to be described later, it is possible to make the grain size number less than 8.0 and to make the tensile strength 690 MPa or more.

[Producing Method]

The method for producing the austenitic stainless steel of the present embodiment includes a step of preparing starting material and a step of subjecting the starting material to hot working. The producing method will be described below.

[Step of Preparing Starting Material]

Molten steel having the previously-mentioned chemical composition is produced. As necessary, well-known degassing is performed on the produced molten steel. From the degassed molten steel, starting material is produced. A method for producing the starting material is, for example, a continuous casting process. By the continuous casting process, continuous casting material (starting material) is produced. The continuous casting material is, for example, slab, bloom, billet, and the like. The molten steel may be subjected to an ingot-making process to be made into an ingot.

[Step of Hot Working]

The starting material (continuous casting material or an ingot) is subjected to hot working by a method well-known to be made into an austenitic stainless steel product. The austenitic stainless steel product is, for example, a steel pipe, a steel plate, a steel bar, a wire rod, a forged steel, or the like. The austenitic stainless steel product may be made by, for example, hot extrusion working according to the Ugine-Sejournet process.

The austenitic stainless steel product may be produced by a single operation of hot working, or by a plurality of operations of hot working. When the hot working is performed by the plurality of operations, reheating is performed before every operation of hot working after the second operation so as to perform the working on the entire steel uniformly. This makes the mixed grain ratio of the crystal grain micro-structure of the steel low.

In the final operation of hot working (the hot working if the hot working is performed only once, otherwise the final operation of the hot working), heating conditions and the reduction of area by the hot working are as follows.

Heating temperature: 1000 to 1250° C.

An excessively low heating temperature is liable to result in a crack attributable to impurity elements such as P. On the other hand, an excessively high heating temperature is liable to result in a crack inside a steel product due to the occurrence of grain boundary melting. Therefore, a preferable heating temperature ranges from 1000 to 1250° C.

Reduction of area: 70% or less

When the cross-sectional area of the starting material before the final operation of the hot working is denoted by A0 (mm$^2$), and the cross-sectional area of the starting material after the final operation of the hot working is denoted by A1 (mm$^2$), a reduction of area RA (%) is defined with Formula (3).

$$RA = (A0 - A1)/A0 \times 100 \quad (3)$$

When the reduction of area previously described is excessively high, crystal grains are made to be fine by the hot working, and the grain size number becomes 8.0 or more. Therefore, the reduction of area is made to be 70% or less.

Figure 3:
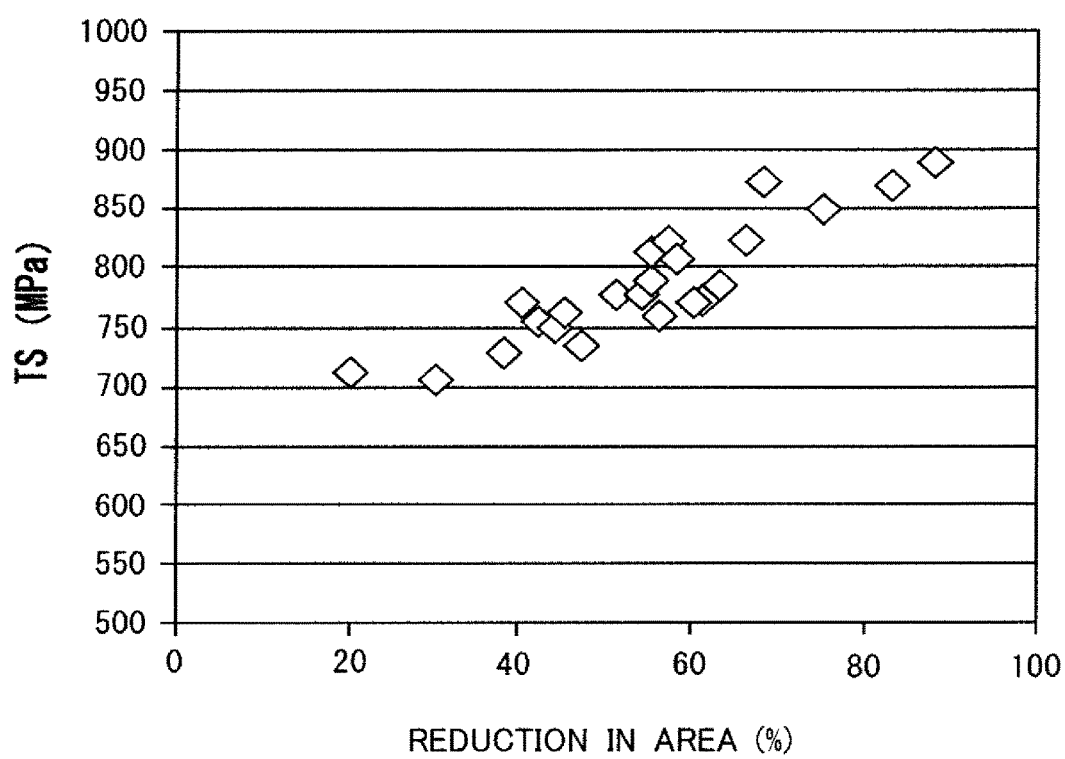
FIG. 3 is a diagram illustrating the relation between a reduction of area and a tensile strength in the austenitic stainless steel of the present embodiment.

Meanwhile, as illustrated in FIG. 3, in a steel product satisfying the chemical composition described above and Formula (1), the reduction of area RA in the final operation of the hot working has a proportional relation with a tensile strength TS. For this reason, an excessively low reduction of area RA may lead to a low tensile strength although the steel product is an austenitic stainless steel product satisfying the chemical composition described above and Formula (1). Therefore, in order to increase the tensile strength, the reduction of area is set as appropriate.

Preferably, the reduction of area RA is made to be 20% or more for an austenitic stainless steel product satisfying the chemical composition described above and Formula (1). In this case, the tensile strength TS of the austenitic stainless steel product after the final operation of the hot working is 690 MPa or more. More preferably, the reduction of area RA is made to be 30% or more. In this case, the mixed grain ratio of the austenitic stainless steel can be made to be further low. This allows the suppression of variations in strength and machinability. Still more preferably, the reduction of area RA is made to be more than 35%. In this case, the tensile strength of the austenitic stainless steel can be further increased.

In the producing step of the present embodiment, solution treatment and cold working after the hot working are omitted. That is, the austenitic stainless steel of the present embodiment is a material as subjected to the hot working.

The austenitic stainless steel produced by the above producing steps is excellent in hydrogen brittleness resistance and machinability and has a high strength.

EXAMPLE

[Test Method]

Molten steels having chemical compositions of test numbers A1 to A20 and B1 to B9 shown in Table 1 were produced with a vacuum furnace.

TABLE 1

| Test number | Chemical composition (mass %, the balance being Fe and impurities) | | | | | | | | | | | |
|---|---|---|---|---|---|---|---|---|---|---|---|---|
| | C | Si | Mn | P | S | Ni | Cr | Mo | N | Nb | V | F1 |
| A1 | 0.030 | 0.70 | 4.59 | 0.013 | 0.0002 | 11.70 | 22.05 | 2.00 | 0.32 | 0.18 | 0.22 | 21.7 |
| A2 | 0.030 | 0.36 | 4.44 | 0.015 | 0.0002 | 11.80 | 21.70 | 1.20 | 0.31 | 0.21 | 0.21 | 21.5 |
| A3 | 0.033 | 0.39 | 4.51 | 0.016 | 0.0003 | 12.21 | 22.07 | 2.22 | 0.33 | 0.20 | 0.21 | 22.3 |
| A4 | 0.031 | 0.44 | 4.00 | 0.017 | 0.0005 | 10.17 | 21.57 | 1.98 | 0.21 | 0.18 | 0.23 | 17.9 |
| A5 | 0.030 | 0.43 | 4.49 | 0.014 | 0.0003 | 12.04 | 21.80 | 1.99 | 0.32 | 0.20 | 0.22 | 21.9 |
| A6 | 0.010 | 0.34 | 5.70 | 0.016 | 0.0002 | 12.35 | 24.34 | 2.23 | 0.32 | 0.21 | 0.20 | 23.3 |
| A7 | 0.027 | 0.33 | 4.23 | 0.012 | 0.0006 | 11.98 | 22.06 | 2.12 | 0.31 | 0.20 | 0.20 | 21.4 |
| A8 | 0.055 | 0.36 | 3.10 | 0.015 | 0.0002 | 14.50 | 23.40 | 1.75 | 0.18 | — | 0.30 | 21.1 |
| A9 | 0.029 | 0.38 | 4.46 | 0.016 | 0.0003 | 12.11 | 22.41 | 1.98 | 0.32 | 0.20 | 0.19 | 22.0 |
| A10 | 0.035 | 0.39 | 4.44 | 0.017 | 0.0650 | 11.98 | 22.16 | 2.07 | 0.31 | 0.20 | 0.20 | 21.7 |
| A11 | 0.055 | 0.41 | 4.55 | 0.016 | 0.0050 | 12.13 | 20.11 | 2.10 | 0.33 | 0.19 | 0.20 | 22.6 |
| A12 | 0.032 | 0.41 | 4.50 | 0.017 | 0.0030 | 12.24 | 22.08 | 2.07 | 0.32 | 0.32 | — | 22.2 |
| A13 | 0.029 | 0.39 | 4.68 | 0.015 | 0.0002 | 12.10 | 22.04 | 2.07 | 0.32 | 0.21 | 0.24 | 22.2 |
| A14 | 0.034 | 0.42 | 4.40 | 0.004 | 0.0025 | 12.08 | 18.10 | 3.40 | 0.31 | 0.09 | 0.23 | 21.8 |
| A15 | 0.042 | 0.39 | 4.35 | 0.014 | 0.0008 | 13.00 | 21.91 | 2.55 | 0.32 | 0.19 | 0.18 | 22.9 |
| A16 | 0.060 | 0.40 | 5.91 | 0.014 | 0.0004 | 10.55 | 21.83 | 2.10 | 0.38 | 0.45 | 0.07 | 23.2 |
| A17 | 0.028 | 0.35 | 4.11 | 0.016 | 0.0006 | 10.30 | 21.34 | 2.04 | 0.26 | — | — | 18.9 |
| A18 | 0.040 | 0.30 | 2.10 | 0.028 | 0.0008 | 13.50 | 21.40 | 1.30 | 0.10 | — | — | 17.7 |
| A19 | 0.035 | 0.35 | 4.69 | 0.011 | 0.0002 | 13.52 | 21.99 | 2.23 | 0.31 | 0.18 | 0.19 | 23.5 |
| A20 | 0.031 | 0.48 | 4.33 | 0.013 | 0.0005 | 12.79 | 20.28 | 2.21 | 0.38 | 0.41 | 0.32 | 23.4 |
| B1 | 0.033 | 0.35 | 5.50 | 0.016 | 0.0011 | 12.36 | 22.06 | 2.05 | 0.38 | 0.30 | 0.22 | 24.3 |
| B2 | 0.031 | 0.36 | 5.65 | 0.015 | 0.0009 | 12.45 | 21.80 | 2.49 | 0.32 | 0.28 | 0.21 | 23.6 |
| B3 | 0.034 | 0.35 | 5.70 | 0.015 | 0.0010 | 11.75 | 21.90 | 2.04 | 0.31 | 0.28 | 0.03 | 22.8 |
| B4 | 0.050 | 0.48 | 0.86 | 0.020 | 0.0008 | 10.23 | 16.07 | 2.07 | 0.04 | — | — | 12.4 |
| B5 | 0.041 | 0.31 | 3.15 | 0.015 | 0.0002 | 8.15 | 17.50 | 1.15 | 0.12 | 0.11 | — | 13.8 |
| B6 | 0.030 | 0.30 | 1.95 | 0.028 | 0.0008 | 9.50 | 18.63 | 0.61 | 0.09 | — | — | 13.3 |
| B7 | 0.023 | 0.42 | 3.32 | 0.017 | 0.0006 | 5.02 | 17.61 | 1.81 | 0.25 | 0.19 | 0.21 | 12.5 |
| B8 | 0.025 | 0.41 | 3.35 | 0.017 | 0.0004 | 5.12 | 17.80 | 2.05 | 0.29 | — | — | 13.3 |
| B9 | 0.027 | 0.33 | 4.23 | 0.012 | 0.0006 | 11.98 | 22.06 | 2.12 | 0.31 | 0.20 | 0.20 | 21.4 |

F1 in Table 1 is the value of F1 by the definition previously mentioned. From the molten steel of each test number, a 50-kg ingot was produced. The ingot was subjected to the hot forging to produce into a block having a thickness of 70 mm.

The produced block was subjected to the final operation of hot working (hot rolling) to produce an austenitic stainless steel plate. A heating temperature (° C.) and a reduction of area RA (%) in the final operation of hot working were set as shown in Table 2. Only on the test number 89, solution heat treatment was performed. In the solution heat treatment, the temperature was 1060° C., and the heating time period was 30 minutes.

TABLE 2

| Test number | Heating temperature (° C.) | Reduction of area (%) | Solution heat treatment | Grain size number | TS (MPa) | Relative rupture elongation (%) | Relative amount ratio of wear | Mixed grain ratio (%) |
| --- | --- | --- | --- | --- | --- | --- | --- | --- |
| A1 | 1200 | 66 | No | 7.5 | 825.3 | 90 | 0.44 | 0 |
| A2 | 1250 | 63 | No | 7.3 | 787.9 | 89 | 0.48 | 5 |
| A3 | 1250 | 58 | No | 6.8 | 809.3 | 94 | 0.47 | 0 |
| A4 | 1200 | 51 | No | 6.4 | 779.3 | 91 | 0.48 | 5 |
| A5 | 1200 | 61 | No | 6.8 | 774.3 | 93 | 0.49 | 5 |
| A6 | 1200 | 45 | No | 5.4 | 764.2 | 97 | 0.49 | 5 |
| A7 | 1200 | 45 | No | 5.7 | 761.7 | 92 | 0.50 | 5 |
| A8 | 1200 | 38 | No | 5.1 | 730.1 | 86 | 0.52 | 10 |
| A9 | 1200 | 56 | No | 6.8 | 761.3 | 90 | 0.50 | 5 |
| A10 | 1250 | 47 | No | 5.7 | 736.5 | 88 | 0.55 | 10 |
| A11 | 1250 | 40 | No | 5.2 | 772.4 | 86 | 0.51 | 5 |
| A12 | 1250 | 42 | No | 5.0 | 756.1 | 87 | 0.52 | 5 |
| A13 | 1200 | 54 | No | 6.5 | 779.3 | 91 | 0.49 | 0 |
| A14 | 1250 | 55 | No | 6.1 | 815.6 | 92 | 0.52 | 0 |
| A15 | 1200 | 57 | No | 7.3 | 824.0 | 90 | 0.43 | 0 |
| A16 | 1250 | 68 | No | 7.8 | 875.4 | 91 | 0.42 | 0 |
| A17 | 1200 | 44 | No | 5.0 | 751.1 | 86 | 0.49 | 10 |
| A18 | 1250 | 30 | No | 5.0 | 706.0 | 85 | 0.53 | 10 |
| A19 | 1250 | 35 | No | 2.7 | 692.6 | 90 | 0.58 | 5 |
| A20 | 1200 | 20 | No | 3.1 | 713.2 | 81 | 0.53 | 25 |
| B1 | 1200 | 88 | No | 10.1 | 891.2 | 90 | 0.35 | 0 |
| B2 | 1200 | 83 | No | 9.5 | 872.5 | 91 | 0.33 | 0 |
| B3 | 1200 | 75 | No | 9.1 | 851.2 | 92 | 0.36 | 0 |
| B4 | 1200 | 32 | No | 4.7 | 556.7 | 46 | 0.78 | 15 |
| B5 | 1250 | 45 | No | 5.2 | 655.1 | 53 | 0.62 | 15 |
| B6 | 1200 | 38 | No | 4.8 | 586.1 | 58 | 0.70 | 15 |
| B7 | 1250 | 55 | No | 6.6 | 791.3 | 39 | 0.49 | 10 |
| B8 | 1200 | 60 | No | 6.5 | 772.1 | 43 | 0.49 | 10 |
| B9 | 1250 | 34 | Yes | 2.2 | 687.3 | 90 | 0.60 | 0 |

[Measurement Test on Grain Size]

The steel plate of each test number was cut in a direction perpendicular to a rolling direction. From the resultant section, a portion the surface of which is the center of the section in a width and thickness directions (hereinafter, referred to as an observed surface) was taken as a sample. The observed surface of each sample was subjected to well-known electropolishing. For the observed surface after the electropolishing, a grain size number was determined based on the previously-mentioned method.

[Measurement Test on Mixed Grain Ratio]

The steel plate of each test number was subjected to the microscopy previously mentioned, and the mixed grain ratio thereof was determined by the method previously mentioned. For each test number, the observation was performed on ten visual fields.

[Tensile Test]

For each test number, a round-bar tensile test specimen was taken from the central portion of the steel plate. The round-bar tensile test specimen includes the central axis of the steel plate, and the parallel portion of the round bar test specimen was parallel to the rolling direction of the steel plate. The diameter of the parallel portion was 5 mm. On the round bar test specimen, a tensile test was performed at a normal temperature (25° C.) in the atmosphere, and a tensile strength TS (MPa) of the steel plate was determined for each test number.

[Hydrogen Brittleness Resistance Evaluation Test]

For each test number, two round-bar tensile test specimens (first and second test specimens) were taken from the central portion of the steel plate. Each of the round-bar tensile test specimens includes the central axis of the steel plate, and the parallel portion of the round bar test specimen was parallel to the rolling direction of the steel plate. The diameter of the parallel portion was 3 mm.

On the first test specimen, a tensile test was performed at a normal temperature (25° C.) in the atmosphere (referred to as an atmospheric tensile test) to measure a rupture elongation $BE_0$. Furthermore, on the second test specimen, a tensile test was performed at a normal temperature (25° C.) in a high-pressure hydrogen atmosphere at 45 MPa (referred to as a hydrogen tensile test) to measure a rupture elongation $BE_H$. In both of the atmospheric tensile test and the hydrogen tensile test, a strain rate was set at $3 \times 10^{-6}$/S. The effect of hydrogen brittleness manifests in the form of rupture elongation. Thus, the relative rupture elongation (%) was defined with Formula (4).

$$\text{Relative rupture elongation} = BE_H/BE_0 \times 100 \quad (4)$$

When a test specimen had a relative rupture elongation of 80% or more, the test specimen was determined to be excellent in hydrogen brittleness resistance.

[Machinability Evaluation Test]

For each test number, a bar test specimen was taken from the central portion of the steel plate. Each of the bar test specimens includes the central axis of the steel plate, and the parallel portion of the bar test specimen was parallel to the rolling direction of the steel plate. The bar test specimen had a round cross section, and the diameter thereof was 8 mm.

On the bar test specimen, peeling treatment was performed. The bar test specimen having the diameter of 8 mm was subjected to the peeling treatment for five minutes. In the peeling treatment, a cemented carbide tool equivalent to P20 specified in JIS Standard was used, the cemented carbide tool not being subjected to coating treatment. A cutting speed was 100 m/min, and a feed was 0.2 mm/rev, and a depth of cut was 1.0 min. No lubricant was used in the peeling. The peeling treatment was performed with the above conditions, and an amount of flank wear W1 (mm) of the cemented carbide tool after the test was measured.

Furthermore, a bar test specimen having a chemical composition equivalent to SUS316 specified in JIS Standard (referred to as a reference test specimen) was prepared. The reference test specimen had the same shape as that of the bar test specimen of each test number. On the reference test specimen, the peeling treatment was performed under the same conditions as those of the above, and an amount of flank wear W0 (mm) of the cemented carbide tool after the test was measured. Based on the results of the measurement, a relative amount ratio of wear, which is defined with the following Formula (5), was determined.

$$\text{Relative amount ratio of wear} = W0/W1 \qquad (5)$$

When a test specimen had a relative amount ratio of wear of 0.40 or more, the test specimen was determined to be excellent in machinability.

[Test Result]

Referring to Table 2, the chemical compositions of the steels of the test numbers A1 to A20 were appropriate, satisfying Formula (1). Furthermore, the steels of the test numbers A1 to A20 were produced under appropriate conditions and had grain size numbers of less than 8.0. For this reason, the relative rupture elongations of the steels of these test numbers were 80% or more, exhibiting excellent hydrogen brittleness resistances. Furthermore, the relative amount ratios of wear of the steels of these test numbers were 0.4 or more, exhibiting excellent machinabilities. Furthermore, the tensile strengths of the steels of these test numbers were 690 MPa or more, exhibiting high strengths.

As to the test numbers A1 to A19, the reductions of area in the final operation of hot working were 30% or more. For this reason, the test numbers A1 to A19 were low in mixed grain ratio of grain size as compared with the test number A20 having a reduction of area of 20%.

As to the test numbers A1 to A17, the reductions of area in the final operation of hot working were more than 35%. For this reason, the test numbers A1 to A17 were high in tensile strength, 720 MPa or more, as compared with A18 to A20 having reductions of area of 35% or less.

As to the test numbers A1 to A18 and the test number A20, the grain size numbers were 3.0 or more. For this reason, the test numbers A1 to A18 and the test number A20 were high in tensile strength IS as compared with the test number A19 having a grain size number of less than 3.0.

In contrast, the test numbers B1 to B3 had appropriate chemical compositions but were too high in reduction of area in the final operation of hot working. As a result, the grain size numbers thereof were more than 8.0. For this reason, the test numbers B1 to B3 had relative amount ratios of wear of less than 0.40, which is low in machinability.

The chemical composition of the test number B4 included excessively low contents of Mn and N and did not satisfy Formula (1). For this reason, the test number B4 had a relative rupture elongation of less than 80%, which is low in hydrogen brittleness resistance.

The test number B5 had an appropriate content for each element but did not satisfy Formula (1). For this reason, the test number B5 had a relative rupture elongation of less than 80%, which is low in hydrogen brittleness resistance.

The chemical composition of the test number B6 included excessively low contents of Mn and Mo and did not satisfy Formula (1). For this reason, the test number B6 had a relative rupture elongation of less than 80%, which is low in hydrogen brittleness resistance.

The chemical compositions of the test numbers B7 and B8 included an excessively low content of Ni and did not satisfy Formula (1). For this reason, the test numbers B7 and B8 had relative rupture elongations of less than 80%, which is low in hydrogen brittleness resistance.

The test number B9 had an appropriate content for each element, satisfying Formula (1), but was subjected to the solution heat treatment after the hot working. For this reason, the tensile strength of the test number B9 became less than 690 MPa.

As seen from the above, the embodiment according to the present invention has been described. However, the embodiment previously mentioned is merely an example for practicing the present invention. Therefore, the present invention is not limited to the previously-mentioned embodiment, and the previously-mentioned embodiment can be modified and practiced as appropriate without departing from the scope of the present invention.

The invention claimed is:

1. An austenitic stainless steel comprising a chemical composition consisting of, in mass %:
   C: 0.10% or less;
   Si: 1.0% or less;
   Mn: 2.1 to 6.0%;
   P: 0.045% or less;
   S: 0.1% or less;
   Ni: 8.0 to 16.0%;
   Cr: 15.0 to 30.0%;
   Mo: 1.0 to 5.0%;
   N: 0.05 to 0.45%;
   Nb: 0 to 0.50%; and
   V: 0 to 0.50%,
   with the balance being Fe and impurities, and
   satisfying Formula (1),
   the austenitic stainless steel having a grain size number of 4.0 to less than 8.0 and a tensile strength, at a normal temperature, of 690 MPa or more:

$$15 \leq 12.6C + 1.05Mn + Ni + 15N \qquad (1)$$

where symbols of elements in Formula (1) are to be substituted by contents of the corresponding elements (in mass %).

2. The austenitic stainless steel according to claim 1, comprising one or more elements selected from the group consisting of
   Nb: 0.01 to 0.50% and
   V: 0.01 to 0.50%.

3. The austenitic stainless steel according to claim 1, wherein a mixed grain ratio of a crystal grain microstructure is 20% or less.

4. The austenitic stainless steel according to claim 2, wherein a mixed grain ratio of a crystal grain microstructure is 20% or less.

5. The austenitic stainless steel according to claim 1, wherein a starting material having the chemical composition is subjected to hot working one or a plurality of times, and after last heating, subjected to hot working at a reduction in area of 70% or less.

6. The austenitic stainless steel according to claim 2, wherein a starting material having the chemical composition is subjected to hot working one or a plurality of times, and after last heating, subjected to hot working at a reduction in area of 70% or less.

7. The austenitic stainless steel according to claim 3, wherein a starting material having the chemical composition is subjected to hot working one or a plurality of times, and after last heating, subjected to hot working at a reduction in area of 70% or less.

8. The austenitic stainless steel according to claim 4, wherein a starting material having the chemical composition is subjected to hot working one or a plurality of times, and after last heating, subjected to hot working at a reduction in area of 70% or less.

9. A method for producing the austenitic stainless steel according to claim 1, comprising:
   a step of preparing a starting material having the chemical composition; and
   a step of performing hot working on the starting material one or a plurality of times, wherein
   in the step of performing the hot working, a reduction in area in the hot working after last heating is 70% or less, and
   wherein solution heat treatment and cold working after the step of performing the hot working are omitted.

10. A method for producing the austenitic stainless steel according to claim 2, comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

11. A method for producing the austenitic stainless steel according to claim 3, comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

12. A method for producing the austenitic stainless steel according to claim 4 comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

13. A method for producing the austenitic stainless steel according to claim 5 comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

14. A method for producing the austenitic stainless steel according to claim 6 comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

15. A method for producing the austenitic stainless steel according to claim 7 comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

16. A method for producing the austenitic stainless steel according to claim 8 comprising:
    a step of preparing a starting material having the chemical composition; and
    a step of performing hot working on the starting material one or a plurality of times, wherein
    in the step of performing the hot working, a reduction in area in the hot working after last heating is 70% or less, and
    wherein solution heat treatment and cold working after the step of performing the hot working are omitted.

* * * * *